US011375335B2

(12) United States Patent
Argo

(10) Patent No.: US 11,375,335 B2
(45) Date of Patent: Jun. 28, 2022

(54) SYSTEM AND METHOD OF PUBLISHING DIGITAL MEDIA TO AN END USER BASED ON LOCATION DATA

(71) Applicant: Timothy Edwin Argo, Roswell, NM (US)

(72) Inventor: Timothy Edwin Argo, Roswell, NM (US)

( * ) Notice: Subject to any disclaimer, the term of this patent is extended or adjusted under 35 U.S.C. 154(b) by 246 days.

(21) Appl. No.: 16/454,227

(22) Filed: Jun. 27, 2019

(65) Prior Publication Data
US 2020/0344566 A1 Oct. 29, 2020

Related U.S. Application Data

(60) Provisional application No. 62/838,402, filed on Apr. 25, 2019.

(51) Int. Cl.
*H04W 52/24* (2009.01)
*H04W 4/021* (2018.01)
*H04L 67/55* (2022.01)
*G06F 16/29* (2019.01)
*G06F 16/958* (2019.01)
*H04W 76/50* (2018.01)
*H04W 4/90* (2018.01)
*G06F 40/205* (2020.01)
*G06F 16/38* (2019.01)
*G06F 21/60* (2013.01)
*G06F 21/34* (2013.01)

(52) U.S. Cl.
CPC ............ *H04W 4/021* (2013.01); *G06F 16/29* (2019.01); *G06F 16/958* (2019.01); *H04L 67/26* (2013.01)

(58) Field of Classification Search
USPC ........................................................ 707/722
See application file for complete search history.

(56) References Cited

U.S. PATENT DOCUMENTS

| 5,414,408 | A | 5/1995 | Berra |
| 8,350,721 | B2 | 1/2013 | Carr |
| 8,401,514 | B2 | 3/2013 | Ebdon et al. |
| 8,649,759 | B2 | 2/2014 | Scott et al. |
| 8,688,070 | B2 | 4/2014 | Forstall et al. |
| 9,426,303 | B1* | 8/2016 | Edwards ............... H04W 4/023 |
| 9,445,231 | B2* | 9/2016 | Florins .................. H04W 4/021 |
| 9,521,517 | B2 | 12/2016 | Best |
| 9,572,002 | B2 | 2/2017 | South |
| 9,747,329 | B2* | 8/2017 | Petrie ...................... G06F 16/24 |
| 9,773,222 | B2* | 9/2017 | Wallace ................. G06Q 40/06 |
| 9,792,788 | B2 | 10/2017 | Joseph et al. |
| 9,813,886 | B2 | 11/2017 | Klein et al. |

(Continued)

Primary Examiner — Jude Jean Gilles
(74) Attorney, Agent, or Firm — Dunlap Bennett & Ludwig, PLLC

(57) ABSTRACT

A system and method for publishing digital media to an end user at a specified location includes a computing device. The computing device displays a map portion of a geographic region on a digital display. The computing device receives at least one selection by a primary user for a portion of the geographic region represented by the map, creating at least one geofence, and the computing device may attach digital media to the at least one first geofence by the primary user. The digital media is retrievable from a mobile computing device of an end user when the mobile computing device is within a geographic location corresponding to the at least one geofence.

17 Claims, 2 Drawing Sheets

(56) References Cited

U.S. PATENT DOCUMENTS

| | | |
|---|---|---|
| 9,860,723 B2 | 1/2018 | R et al. |
| 9,860,724 B2 | 1/2018 | Kwan et al. |
| 9,866,703 B2 | 1/2018 | Brown et al. |
| 9,877,150 B2 | 1/2018 | Sennett et al. |
| 9,922,477 B2 | 3/2018 | Kerning et al. |
| 9,990,836 B2 | 6/2018 | Will et al. |
| 10,484,815 B1* | 11/2019 | Smith ............... H04W 4/021 |
| 10,560,497 B1* | 2/2020 | Smith ............... H04L 65/1069 |
| 2005/0245232 A1 | 11/2005 | Jakober et al. |
| 2006/0049933 A1 | 3/2006 | Kelley et al. |
| 2008/0086497 A1* | 4/2008 | Wallace ............... G06Q 10/00 |
| 2009/0216775 A1* | 8/2009 | Ratliff ............... G06Q 10/08 |
| 2010/0328093 A1 | 12/2010 | Robinson et al. |
| 2012/0242483 A1 | 9/2012 | Kuo et al. |
| 2012/0260313 A1 | 10/2012 | Gomez |
| 2013/0099919 A1 | 4/2013 | Cai et al. |
| 2014/0364081 A1* | 12/2014 | Rauner ............... H04L 12/1895 455/404.2 |
| 2015/0050950 A1* | 2/2015 | Alon ............... H04W 4/029 455/456.1 |
| 2015/0111524 A1* | 4/2015 | South ............... H04W 4/021 455/404.2 |
| 2015/0141055 A1* | 5/2015 | Barrand ............... H04W 64/00 455/456.3 |
| 2015/0245189 A1* | 8/2015 | Nalluri ............... H04W 8/22 455/404.1 |
| 2015/0271630 A1* | 9/2015 | Ferrara ............... H04L 51/20 455/456.3 |
| 2016/0119748 A1* | 4/2016 | Li ............... H04L 67/26 455/456.3 |
| 2016/0132981 A1 | 5/2016 | Cherry et al. |
| 2016/0147962 A1* | 5/2016 | Vollmar ............... G16H 15/00 705/2 |
| 2016/0232773 A1 | 8/2016 | Abeyta et al. |
| 2017/0010936 A1 | 1/2017 | Daoud et al. |
| 2017/0171754 A1* | 6/2017 | South ............... H04W 4/90 |
| 2018/0199179 A1* | 7/2018 | Rauner ............... G08B 25/10 |
| 2018/0204428 A1 | 7/2018 | Asaro et al. |

\* cited by examiner

SYSTEM AND METHOD OF PUBLISHING DIGITAL MEDIA TO AN END USER BASED ON LOCATION DATA

CROSS-REFERENCE TO RELATED APPLICATION

This application claims the benefit of priority of U.S. provisional application No. 62/838,402, filed Apr. 25, 2019, the contents of which are herein incorporated by reference.

BACKGROUND OF THE INVENTION

The present invention relates to document publishing and retrieval and, more particularly, to a system and method of retrieving documents and other digital media based on an end user's location data.

Important documents and digital media may need to be accessed by employees within a workplace. Currently, the documents and digital media have to be sent by e-mail, text, or provided in hard copy. The current methods are cumbersome for the sender and end users may lose or delete the documents. Additionally, current methods require a sender to know when someone is in need of the required documents or other digital media.

As can be seen, there is a need for a system and method of retrieving documents and other digital media based on an end user's location data.

SUMMARY OF THE INVENTION

In one aspect of the present invention, a method of retrieving digital media based on location of an end user comprises the steps of: displaying, via software running on a computing device, a map portion of a geographic region; receiving, via software running on a computing device, at least one selection by a primary user for a portion of the geographic region represented by the map, creating at least one geofence; and attaching, via software running on the computing device, digital media to the at least one first geofence by the primary user, wherein the digital media is retrievable from a mobile computing device of an end user when the mobile computing device is within a geographic location corresponding to the at least one geofence.

In another aspect of the present invention, a system for publishing digital media to an end user at a specified location, comprises: at least one processor; at least one memory; at least one communication interface for communicating over a network; and a plurality of program instructions stored in the at least one memory that, when executed by the at least one processor, cause the at least one processor to: display a map portion of a geographic region; receive at least one selection by a primary user for a portion of the geographic region represented by the map, creating at least one geofence; and attaching digital media to the at least one first geofence by the primary user, wherein the digital media is retrievable from a mobile computing device of an end user when the mobile computing device is within a geographic location corresponding to the at least one geofence.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

The present invention includes a system of geofencing that provides emergency action plan documents and other digital media to a receiver based on GPS or cellular triangulation. The present invention provides on demand information by location to anyone in the pre-selected geofenced area.

Figure 1:
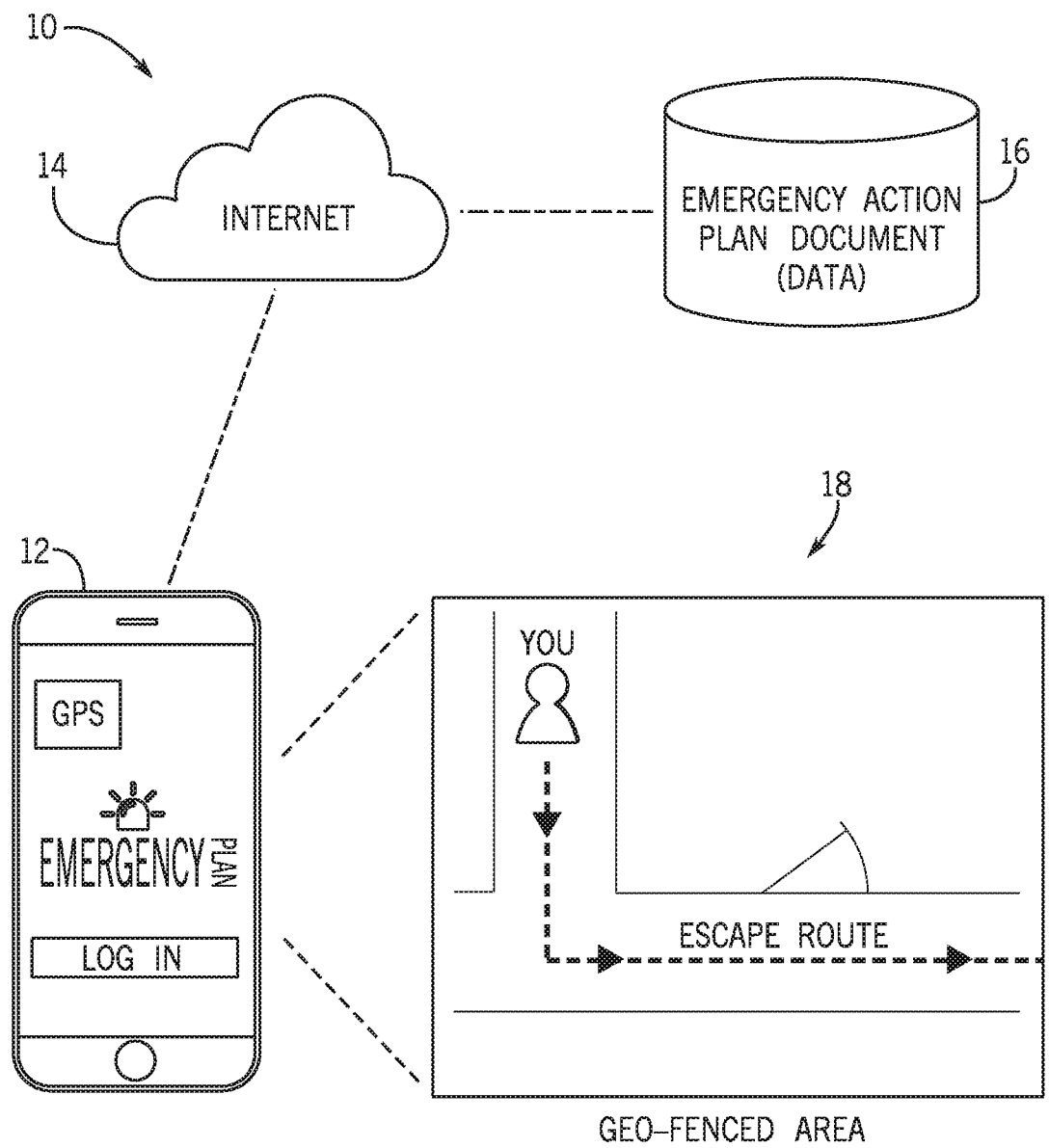
FIG. 1 is a schematic view of an embodiment of the present invention.
Figure 2:
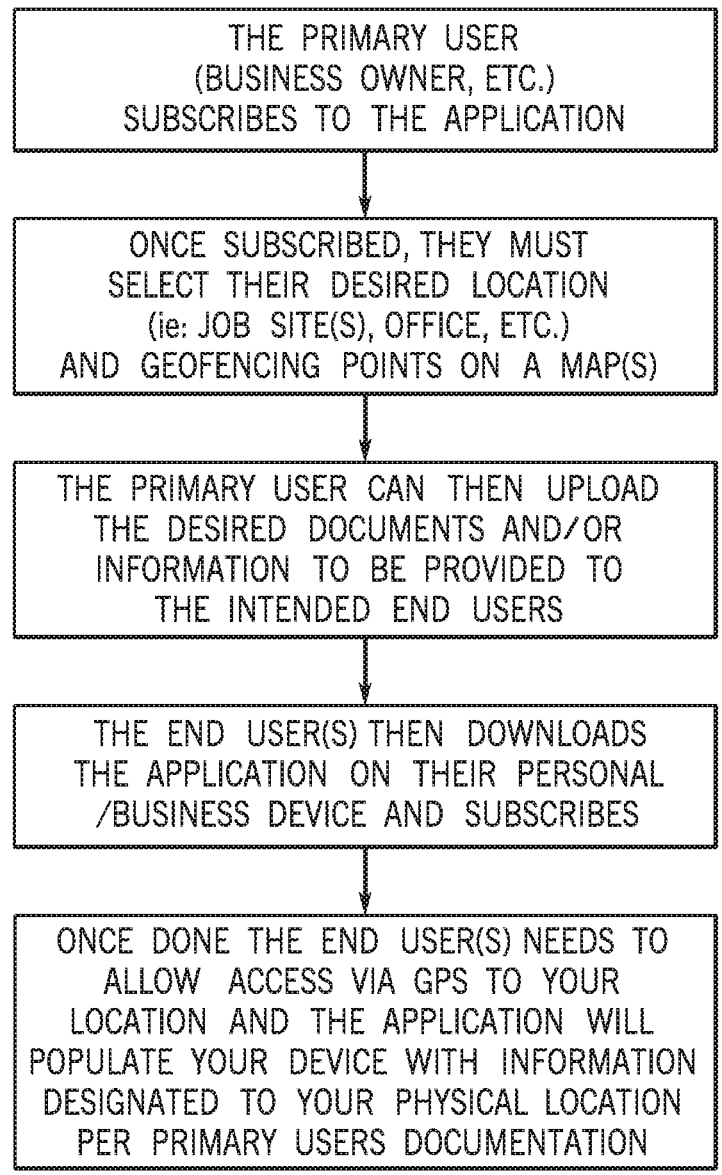
FIG. 2 is a flowchart of an embodiment of a method of the present invention.

Referring to FIGS. 1 and 2, the present invention includes a system and method 10 for publishing digital media to an end user at a specified location. The system and method 10 may be performed on a computing device 12 including at least one processor, at least one memory, at least one communication interface for communicating over a network 14, and a plurality of program instructions stored in the at least one memory that, when executed by the at least one processor, cause the at least one processor to perform steps. The computing device 12 may display a map portion of a geographic region on a digital display. The computing device may further receive at least one selection by a primary user for a portion of the geographic region represented by the map, creating at least one geofence 18, and the computing device 12 may attach digital media 16 to the at least one first geofence 18 by the primary user. The digital media 16 is retrievable from a mobile computing device 12 of an end user when the mobile computing device 12 is within a geographic location corresponding to the at least one geofence 18.

The computing devices 12 may include, but are not limited to, laptops, desktops, or smart devices, such as smart phones and tablets. Each of the computing devices 12 include at least the processor and the memory. The computing devices 12 may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing devices 12 include a processor, memory, a user interface, and a communication interface. In particular embodiments, the processor includes hardware for executing instructions, such as those making up the software program. The memory includes main memory for storing instructions such as software program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to the computing devices 12, where appropriate. In particular embodiments, the memory is non-volatile, solid-state memory.

The user interface includes hardware, software, or both providing one or more interfaces for user communication with the computing devices 12. As an example, and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface includes hardware, software, or both providing one or more interfaces for communication (e.g., packet-based communication) between the computing devices 12 on one or more networks. As an example, and not by way of limitation, the computing devices 12 may include a communication interface including a network interface card (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the computing devices 12 may communicate via an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing devices 12 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing devices 12 may include any suitable communication interface for any of these networks, where appropriate.

As mentioned above, the primary user may select a series of points to create the geofence 18. The present invention includes a selection system for specifying a geolocation. Particularly, the primary user can locate a desired location in a browser using, for example, a map application such as Google Maps®. The user can then click a variety of points to define a polygon (or expand a rectangle, circle, etc.).

The user can identify a region of interest by zooming into a region of the map (for example, by scrolling a mouse wheel) or selecting icons. The user can also enter an address in a box, and the map may automatically center and/or zoom to that address. By selecting a generate geolocation icon, the system allows the user to create the geofence 18. The user can indicate a plurality of points to define the boundaries of the geofence 18. The geofence 18 may be made as a polygon, circles, rectangles, and other predefined shapes can also be used for order specification.

For example, the primary user can select a first point on the map. Following the first point selection, the system can depict, via a dotted line or other indicator, the resulting edge that would be created were the user to again select another position on the map. The primary user selects a second position. The primary user again moves the cursor to another point and a dotted line indicates the potentially resultant edge. A third point is selected. The system can then fill in the resulting triangular region to provide the primary user with an indication of the area within the geofence. The user can continue to create additional polygonal points, or the user can select the initially generated point to complete the geofence. A confirmatory popup can be presented allowing the primary user to name the geofence 18 for future reference, or to delete the geofence 18. In certain embodiments, the at least one selection is a plurality of selections creating a plurality of geofences 18. The primary user may attach different digital media 16 to each of the plurality of geofences 18.

As mentioned above, the primary user is able to attach digital media 16 to the specified geofencing 18. In such embodiments, the digital media 16 may be stored on the computing device or a remote server, such as a cloud-based server. The computing system 12 may allow the primary user to log into an account of the present invention using credentials. The primary user may then create the geofence 18 as described above, and then drag and drop the digital media 16 into the geofence 18. The linked geofence 18 and digital media 16 is then saved to a remote server, which may be disseminated over the internet 14 to those end users that enter the geographic location corresponding to the geofence 18.

The end user of the present invention may be verified by logging into an account of the present invention using credentials. In certain embodiments, the present invention may include an application loaded on a memory of the mobile computing device 12. The end user may open the application and log into the application. When the end user enters the geographic location, the application may use the global positioning system of the mobile computing device 12 or may calculate the location of the mobile computing device 12 using cellular towers. Once the application verifies that the user is within the geographic location, the end user may access the digital media 16.

A person uses the present invention to get on demand specific information that may be required for emergency and non-emergency situations simply based on their physical location. The present invention may further provide time keeping data, end users exact location, video/audio recording of emergency situations of end user, automatic emergency help requests and data pushes to unlimited numbers of users. The present invention could be used to send information based on the user's physical location and can be used to receive information based on the user's physical location.

It should be understood, of course, that the foregoing relates to exemplary embodiments of the invention and that modifications may be made without departing from the spirit and scope of the invention as set forth in the following claims.

What is claimed is:

1. A method for publishing one or more emergency action plan documents to an end user at a specified location comprising steps of:
   displaying, via software running on a computing device, a map of a geographic region;
   receiving, via software running on a computing device, at least one selection by a primary user for a portion of the geographic region represented by the map, creating at least one geofence; and
   attaching, prior to an emergency, via software running on the computing device, the one or more pre-planned emergency action plan documents to the at least one geofence by the primary user, wherein
   the one or more pre-planned emergency action plan documents are retrievable from a mobile computing device of an end user immediately upon the mobile computing device being within a geographic location corresponding to the at least one geofence.

2. The method of claim 1, wherein receiving a selection comprises receiving a series of point selections on the map from the primary user and determining a polygon having vertices corresponding to the point selections.

3. The method of claim 1, wherein the mobile computing device is verified by the end user logging into an application loaded on a memory of the mobile computing device.

4. The method of claim 1, wherein a global positioning system of the mobile computing device determines if the mobile computing device is within the at least one geofence.

5. The method of claim 1, wherein the at least one selection is a plurality of selections creating a plurality of geofences, wherein the end user attaches different digital media to each of the plurality of geofences.

6. A system for publishing one or more emergency action plan documents to an end user at a specified location, comprising:
   at least one processor;
   at least one memory;
   at least one communication interface for communicating over a network; and
      a plurality of program instructions stored in the at least one memory that, when executed by the at least one processor, cause the at least one processor to:
      display a map of a geographic region;
      receive at least one selection by a primary user for a portion of the geographic region represented by the map, creating at least one geofence; and
      attaching prior to an emergency one or more pre-planned emergency action plan documents to the at least one geofence by the primary user, wherein
   the pre-planned one or more emergency action plan documents are retrievable from a mobile computing device of an end user immediately upon the mobile computing device being within a geographic location corresponding to the at least one geofence.

7. The system of claim 6, wherein receiving a selection comprises receiving a series of point selections on the map from the primary user and determining a polygon having vertices corresponding to the point selections.

8. The system of claim 6, wherein the mobile computing device is verified by the end user logging into an application loaded on a memory of the mobile computing device.

9. The system of claim 6, wherein a global positioning system of the mobile computing device determines if the mobile computing device is within the geographic location corresponding to the at least one geofence.

10. The system of claim 6, wherein the at least one selection is a plurality of selections creating a plurality of geofences, wherein the primary user attaches different digital media to each of the plurality of geofences.

11. The system of claim 6, wherein the one or more pre-planned emergency action plan documents are a function of one or more physical objects associated with said geographic location.

12. The system of claim 11, wherein the one or more pre-planned emergency action plan documents includes an escape route.

13. The system of claim 12, further comprising displaying, via software running on a computing device, an indication of the end user on the map based on in part the escape route.

14. The method of claim 1, wherein the one or more pre-planned emergency action plan documents are a function of one or more physical objects associated with said geographic location.

15. The method of claim 14, wherein the one or more pre-planned emergency action plan documents includes an escape route.

16. The method of claim 15, further comprising displaying, via software running on a computing device, an indication of the end user on the map based on in part the escape route.

17. A method for publishing one or more documents to an end user at a specified location comprising steps of:
   displaying, via software running on a computing device, a map of a geographic region;
   receiving, via software running on a computing device, at least one selection by a primary user for a portion of the geographic region represented by the map, creating at least one geofence; and
   attaching, prior to an emergency, via software running on the computing device, the one or more pre-planned documents to the at least one geofence by the primary user, wherein
   the one or more pre-planned documents are retrievable from a mobile computing device of an end user immediately upon the mobile computing device being within a geographic location corresponding to the at least one geofence.

\* \* \* \* \*